United States Patent [19]

Haschka et al.

[11] 4,250,236

[45] Feb. 10, 1981

[54] ADDITIVE FOR ACTIVATING IRON ELECTRODES IN ALKALINE BATTERIES

[75] Inventors: Friedrich Haschka, Esslingen; Gerhard Berger, Stuttgart, both of Fed. Rep. of Germany

[73] Assignee: Firma Deutsche Automobilgesellschaft mbH, Hanover, Fed. Rep. of Germany

[21] Appl. No.: 71,584

[22] Filed: Aug. 30, 1979

[30] Foreign Application Priority Data

Aug. 31, 1978 [DE] Fed. Rep. of Germany ....... 2837980

[51] Int. Cl.³ .......................................... H01M 10/24
[52] U.S. Cl. ..................................... 429/221; 429/207
[58] Field of Search ......................... 429/221, 207, 27; 252/513, 518

[56] References Cited

U.S. PATENT DOCUMENTS

| 2,871,281 | 1/1959 | Moulton et al. | 429/207 |
| 3,992,222 | 11/1976 | Walsh et al. | 429/221 |
| 4,078,120 | 3/1978 | Lindstrom | 429/221 |

FOREIGN PATENT DOCUMENTS

| 1696570 | 8/1972 | Fed. Rep. of Germany | 429/221 |
| 582541 | 11/1977 | U.S.S.R. | 429/221 |

Primary Examiner—Anthony Skapars
Attorney, Agent, or Firm—Browdy and Neimark

[57] ABSTRACT

An additive for the iron electrodes of alkaline batteries which prevents and counteracts the tendency of iron electrodes to become passive and ineffective. The additive consists of sulfide, selenide or telluride which is sparingly soluble in the electrolyte and has a decomposition potential more electronegative than the final charging potential of the iron electrode. The additive may be placed in the active electrode material during manufacture but may also be placed in the battery during or after manufacture, for example in tablet form. The additive may also be introduced in a manner permitting subsequent activation by electrochemical methods. A number of examples is presented.

15 Claims, No Drawings

ADDITIVE FOR ACTIVATING IRON ELECTRODES IN ALKALINE BATTERIES

FIELD OF THE INVENTION

The invention relates to storage batteries, in particular alkaline storage batteries. More particularly, the invention relates to an additive for battery electrodes made of iron or iron compounds.

BACKGROUND OF THE INVENTION AND PRIOR ART

Commercial alkaline battery systems, for example iron/nickel batteries or iron/air batteries are employing iron electrodes to an increasing degree. The iron/nickel system is distinguished by particularly high energy content and low weight with great power capability. By comparison with batteries which use zinc as the negative electrode, these systems give increased operational reliability, and longer life. By comparison, for example, with a cadmium electrode, the iron electrode is substantially cheaper, readily available and is non-toxic. However, commonly used iron electrodes exhibit certain insufficiencies and negative characteristics. Among these are a relatively high degree of self-discharge and a tendency to passivate, especially at high charge and discharge current densities as well as at low temperatures.

For example, iron electrodes whose active mass consists of very pure carbonyl iron become passivated after only a few cycles and thus inoperative. The causes for this passivation are not entirely clear but it is assumed that trivalent iron oxide compounds which are difficult to reduce accumulate on the surface of the active mass of the electrode and inhibit the charging process.

It is known in the art to employ sulfur to counteract the passivating tendency of the electrode. Sometimes the sulfur is already contained in trace amounts in the material during manufacture and at other times it is added to the electrode material during manufacture. Known in the art are methods in which sulfur or sulfides such as iron sulfide, cadmium sulfide, mercury sulfide, or indium sulfide are added to the active electrode mass. It has also been found that some inorganic an organic sulfur-containing combinations with the electrolyte tend to counteract the passivating effect. The active sulfur travels to the active electrode through the electrolyte.

The concentration of sulfur which has been proposed lies in the range of 0.05–5.0 percent of the weight of the iron in the active mass of the electrode. Selenium and tellurium as well as their compounds have also been mentioned as having a positive anti-passivating effect. Recently lead sulfide has been mentioned as an additive to counteract electrode passivation.

It is the common disadvantage of all these additives that they are unable to guarantee a lasting activation of the iron electrode in long-term operation, especially when the electrode is subjected to high charging and discharging current densities and in particular when the battery is overcharged. It is the property of sulfur in the form of sulfide dissolved in an alkaline electrolyte to be adsorbed at the iron electrode. A majority of the sulfide ions will also diffuse from the electrode through its pores and come in contact with oxygen dissolved in the electrolyte or even with the positive electrode. Thus, an oxidation to produce sulfate ions which are ineffective to activate the electrode is virtually unavoidable. Sulfate is virtually incapable of reduction to effective sulfide ions due to kinetic barriers. Instead, it precipitates as alkali sulfate and can even plug up the pores of the electrode. The use of high sulfide concentrations does not result in any substantial prolongation of the lifetime of the electrode.

The effect of a loss of sulfide is generally the gradual decrease of the battery capacity. In iron/nickel cells, the effect may be masked for a long time if the iron electrodes are of substantially greater capacity than the positive electrodes. However, the effect becomes very noticeable when the battery is deep-discharged at high current densities. On the other hand, an activation of the active iron mass requires available sulfide. Thus, the normal battery operation is necessarily impeded because several careful and conservative charging and discharging processes are required to restore the iron electrode to the normal capacity. In some cases, it may be necessary to exchange the electrolyte which introduces additional cost and time losses.

It has been determined that the long-lasting activation of the active iron mass requires the maintenance of a given sulfide concentration in the electrolyte of the porous electrode. This condition has not heretofore been achieved but is attained for the first time by the provisions of the present invention.

The sulfur, selenium and tellurium compounds used heretofore place sulfide ions in the electrolyte not only due to chemical dissolution, but also because of the electrochemical decomposition on the iron electrode during the charging process. As a consequence, there occur unnecessarily high sulfide concentrations, a rapid migration and oxidation to sulfate and a rapid depletion of the sulfide supply. Any uncontrolled and extensive overcharge can produce a local sulfide concentration which is so high as to block the active mass. It has been found that when the sulfide concentration exceeds $10^{-2}$–$10^{-1}$ mol/l at 20° C., the activating effect is actually reversed. The result is a very reduced effectiveness of the active mass and a reduced power capability of the electrode. Even at high operating temperatures of up to 70°, the aforementioned concentration of sulfides should not be exceeded. In that case, the reverse effect will occur when the cell cools off while the high sulfide concentration is temporarily metastable.

Another disadvantage of the known art is that the electrochemical decomposition of the metal sulfides, selenides and tellurides causes deposition of metal on the negative electrode and may lead to malfunctions.

OBJECT AND SUMMARY OF THE INVENTION

It is a principal object of the present invention to provide an iron electrode so constructed as to prevent all the aforementioned disadvantages of known iron electrodes and to guarantee reliable operation. It is another principal object of the invention to provide an additive for iron electrodes which permits them to be used without passivation up to a number of operating cycles which greatly exceeds that previously possible even at high current densities for charging and discharging.

These and other objects are attained according to the invention by providing the use of sulfide, selenide or telluride which is sparingly soluble in the electrolyte and whose decomposition potential is more negative than the final charging potential of the iron electrodes. The decomposition potential is defined as that potential at which, by reference to a reference electrode such as for example an Hg/HgO electrode, the compound is decomposed by an electrochemical reaction, for example a reaction in which a metallic sulfide decomposes into pure metal and sulfide.

The normal operating range of iron electrodes is between $-0.75$ and $-1.2$ volt by reference to an Hg/HgO electrode in an alkaline solution. In such a system, the active mass is discharged down to the formation of bivalent iron. A somewhat greater utilization of the active mass, results from a discharge down to $-0.5$ volt with respect to the Hg/HgO electrode due to the formation of trivalent iron compounds. High current densities can increase the range by approximately 0.1 volt in either direction.

The characteristic of being sparingly soluble should be understood to encompass all materials which do not deliver more than $10^{-2}$ Mol/l (up to 70° C.) of active sulfide, selenide or telluride ions to the electrolyte.

A commonly used electrolyte is KOH or NaOH in the range of concentrations from 1–10 Mol/l, most often 4–6 Mol/l. In many cases LiOH is added to the electrolyte. However, the provision of the invention is not confined to a particular type or concentration of alkaline solution and mixtures thereof are also suitable for practicing the invention.

The additive according to the present invention is effective when used as a solid and part of the active electrode mass. However, the additive according to the invention is also effective when used as an additive to the electrolyte. Even very small amounts, for example 0.01% of the weight of the iron mass, suffice to provide the desired electrode activation. The activating effect of the additive is not impeded by high concentrations of the additive. Furthermore, the additive according to the present invention does not cause the aforementioned undesirable high sulfide concentrations. By direct contrast to previously known additives, the sulfide concentration in the electrolyte is determined entirely by its solubility in the particular alkaline solution and no longer by operating conditions, such as charging time and charging current density. If reliability is most important while the weight of the battery cell plays only a secondary role, it is possible to permit 50% of the active electrode mass to consist of the additive. Generally, it ought to be sufficient to keep the weight percentage of the additive below 20%. A range which has been found to be particularly favorable is the range of 1–5% of the weight of the electrode.

The additive according to the invention not only results in a permanent electrode activation but also substantially reduces the tendency for self-discharge. Therefore, other known additives for electrodes and electrolytes may be used in an iron electrode system provided only that they are compatible with the sulfides, selenides and tellurides used in the system.

The provisions of the invention are applicable to all types of iron electrodes. However, their effect is particularly great and noticeable in electrodes which are constructed for use at high current densities and deep discharge. The additives according to the invention have been tested with electrodes with and without an inert conducting matrix, in pocket electrodes, tubular electrodes, as well as bonded iron plastic electrodes. The additives are usable in any and all electrode constructions, for example any of those described in the publication "Alkaline Storage Batteries" by Falk and Salkind.

In general, the quantity of additive can best be controlled and the method becomes particularly simple if the additive according to the invention is added to the active electrode mass. The distribution of additive should be as uniform as possible and the particle size allowed to be below 100 $\mu$m, preferably between 0.1 and 20 $\mu$m, and still more preferably between 5 and 10 $\mu$m. However, the additive according to the invention may also be admixed to substances or materials which become part of the active mass only in later manufacturing stages. In principle, the active mass may consist of any iron compound but the preferable substances are known to be iron and iron oxides.

It is also possible to place the additive according to the invention in a location separate from the active electrode mass. It is required only that the additive be contacted by the electrolyte. The additive according to the invention even provides a reactivation of already passivated iron electrodes in battery cells which have been used for some time, for example by the suspension of the additive in the electrolyte or by the positioning of additive in tablet form in the vicinity of the iron electrodes. For the latter purpose, the powder having the above-described characteristic of having a grain size of less than 100 $\mu$m can be pressed into tablets. Here too, a grain size of between 0.1–20 $\mu$m and especially between 5 and 10 $\mu$m is preferred to obtain the rapid concentration of the activating additive in the electrolyte. Two examples of the substances which can be used according to the invention are zinc sulfide and manganese sulfide of which all known polymorphs are usable. The additive may be admixed as a powder to the active mass of the electrode during its fabrication. It can also be placed in the active electrode mass before or after cell assembly, for example by the admixture of zinc metal to the active mass and the addition of at least stoichiometric quantities of, for example, alkali sulfides in the electrolyte. The activating substance may be regenerated during the operation both when contained in the active electrode mass as well as in the electrolyte, for example by the addition of alkali sulfide to the electrolyte because zinc remains in solution as zincate without change and is precipitated in the electrode as zinc sulfide. The precipitating agent for zinc can also be sulfur-containing inorganic or organic substances which are reducible to sulfide electrochemically or which are chemically transformed into sulfide in the alkaline solution, such as thiosulfates, mercaptanes or elemental sulfur.

When added to the electrolyte, the activating additive is normally introduced in the solid state, for example as a powder. This manner of introduction is possible both before and after the cell assembly. A still further possibility is the precipitation of the additive before or after the cell assembly, for example by the solution of a zinc compound and an alkali sulfide in the electrolyte. During the operation, the activating material is regenerated in the above-described manner.

The additive according to the invention will now be further described in a number of preferred exemplary embodiments.

DESCRIPTION OF EXEMPLARY EMBODIMENTS

EXAMPLE 1

The starting material for the construction of the iron electrode was carbonyl iron with a particle diameter of 2-10 μm, sodium chloride with a grain size from 30-50 μm and zinc sulfide with a grain size from 5-10 μm. Sodium chloride constituted 40% by weight and zinc sulfide 2%. After intensive mixing of these components, they were pressed-formed into an electrode having a surface area of 100 cm$^2$ at a pressure of 1.5 t/cm$^2$. The electrode was then sintered at 820° C. in hydrogen or some other non-oxidizing atmosphere for one hour. When the sintered electrode had cooled, the sodium chloride was removed by leaching in water. The electrode was formed in 6 M KOH and then produced 0.31 Ah/(gram of active mass) until a discharge level of −0.8 volt with respect to a Hg/HgO electrode and 0.46 Ah/g up to a final discharge voltage of −0.5 volt. After 800 cycles of operation, no reduction of capacity or any irregular behavior of the discharge curve was noticed.

EXAMPLE 2

An iron electrode was produced in the manner described in example 1. Zinc sulfide was replaced by manganese sulfide with a grain size of 10-30 μm and a weight of 5% of the active electrode mass. After formation the electrode delivered 0.3 Ah/g up to the final discharge potential of −0.8 volt with respect to a Hg/HgO electrode in a 6 M KOH solution. The electrode capacity was undiminished after 700 cycles of operation.

EXAMPLE 3

A mixture of magnetite with a grain size of between 0.5 and 2 μm was mixed with zinc sulfide between 5-10 μm and graphite powder to serve as the active electrode mass. The percentage of zinc sulfide was 2% by weight and that of graphite 8% by weight. This mass was placed between perforated steel foils and formed into a pocket electrode under compression. The discharge capacity with reference to a Hg/HgO electrode down to −0.8 volt was 0.27 Ah/g of active mass and did not change during 700 cycles of operation.

EXAMPLE 4

Carbonyl iron and zinc sulfide were mixed with water to produce a slurry which was introduced into a steel fiber felt. The proportion of zinc sulfide was 5% by weight and the grain sizes were the same as those listed in example 1. The electrode maintained its initial capacity of 0.37 Ah/g down to a final discharge potential of −0.8 volt with respect to Hg/HgO in 6 M NaOH in 800 cycles of operation.

EXAMPLE 5

An iron electrode was constructed as in Example 1 except without the addition of sulfide. Zinc sulfide was then placed below the iron electrode in tablet form. The operation of the electrode was unimpeded.

EXAMPLE 6

Carbonyl iron and 4% by weight of zinc metal was mixed in water to form a slurry which was placed in a steel fiber felt. In the formation electrolyte, sulfur was contained as alkali sulfide. After a few cycles, the electrode reached its formation capacity of 0.3 Ah/g of active mass. The capacity remained undiminished for the subsequent 900 cycles.

EXAMPLE 7

Carbonyl iron and 5% by weight of zinc sulfide with the grain sizes described in Example 1 were mixed in polyvinylalcohol solution to form a paste which was pressed on a copper mesh and dried. The electrode performed without failure in 800 cycles after formation.

EXAMPLE 8

Three iron electrodes constructed according to the prescription of Example 1 were combined in a battery cell with four nickel oxide electrodes and with porous separators. The electrolyte was 6 M KOH with addition of 0.4 M LiOH. The cell was charged for five hours and discharged for one hour down to a final discharge voltage of 1.0 volt. The positive electrodes were intentionally made with larger capacities than the negative electrodes. After 950 cycles of operation, there was no change in battery capacity nor any change in the voltage curve during discharge.

The foregoing examples illustrate preferred exemplary embodiments of the invention and other embodiments and variants of electrodes constructed according to the invention are possible without departing from the spirit and scope of the invention.

We claim:

1. An alkaline battery containing an iron electrode and an activating additive for said iron electrode, said additive comprising at least one substance from the class consisting of sulfide, telluride and selenide, said substance being sparingly soluble in the electrolyte of the battery and having a decomposition potential which is more negative than the final charging potential of the iron electrode, and said additive being placed in said battery separately from the active mass of the iron electrode.

2. An alkaline battery containing an iron electrode and an activating additive for said iron electrode, said additive comprising at least one substance from the class consisting of sulfide, telluride and selenide, said substance being sparingly soluble in the electrolyte of the battery and having a decomposition potential which is more negative than the final charging potential of the iron electrode, and said additive being placed in the active mass of the iron electrode.

3. An alkaline battery in accordance with claim 2, wherein said additive is formed by chemical or electrochemical reaction in the active mass of the electrode.

4. An alkaline battery in accordance with claim 1, wherein said additive is formed by chemical or electrochemical reaction within the electrolyte.

5. An alkaline battery in accordance with claim 1, wherein said additive is placed in the battery before battery assembly.

6. An alkaline battery in accordance with claim 1, wherein said additive is placed in the battery after battery assembly.

7. An alkaline battery according to claim 1 or 2, wherein the solubility of said activating additive is at most 10$^{-2}$ Mol/l up to 70° C.

8. An alkaline battery according to claim 1 or 2, wherein said activating additive consists at least partially of one or more substances from the group consisting of zinc sulfide, manganese sulfide and lanthanum sulfide.

9. An alkaline battery according to claim 1 or 2, wherein said activating additive constitutes 0.01-20% of the weight of the active mass of said iron electrode.

10. An alkaline battery according to claim 1 or 2, wherein said activating additive constitutes 1-5% of the weight of the active mass of said iron electrode.

11. An alkaline battery according to claim 1 or 2, wherein said activating additive is present therein in powder form.

12. An alkaline battery according to claim 1 or 2, wherein said activating additive is present therein as pressed and formed powder.

13. An alkaline battery according to claim 1 or 2, wherein said activating additive is present therein as a paste.

14. An alkaline battery according to claim 1 or 2, wherein said activating additive is present therein as a suspension with particles having diameters smaller than 100 μm.

15. An alkaline battery according to claim 1 or 2, wherein said activating additive is present therein as a suspension with particles having diameters between 1 and 10 μm.

* * * * *